Figure 1:
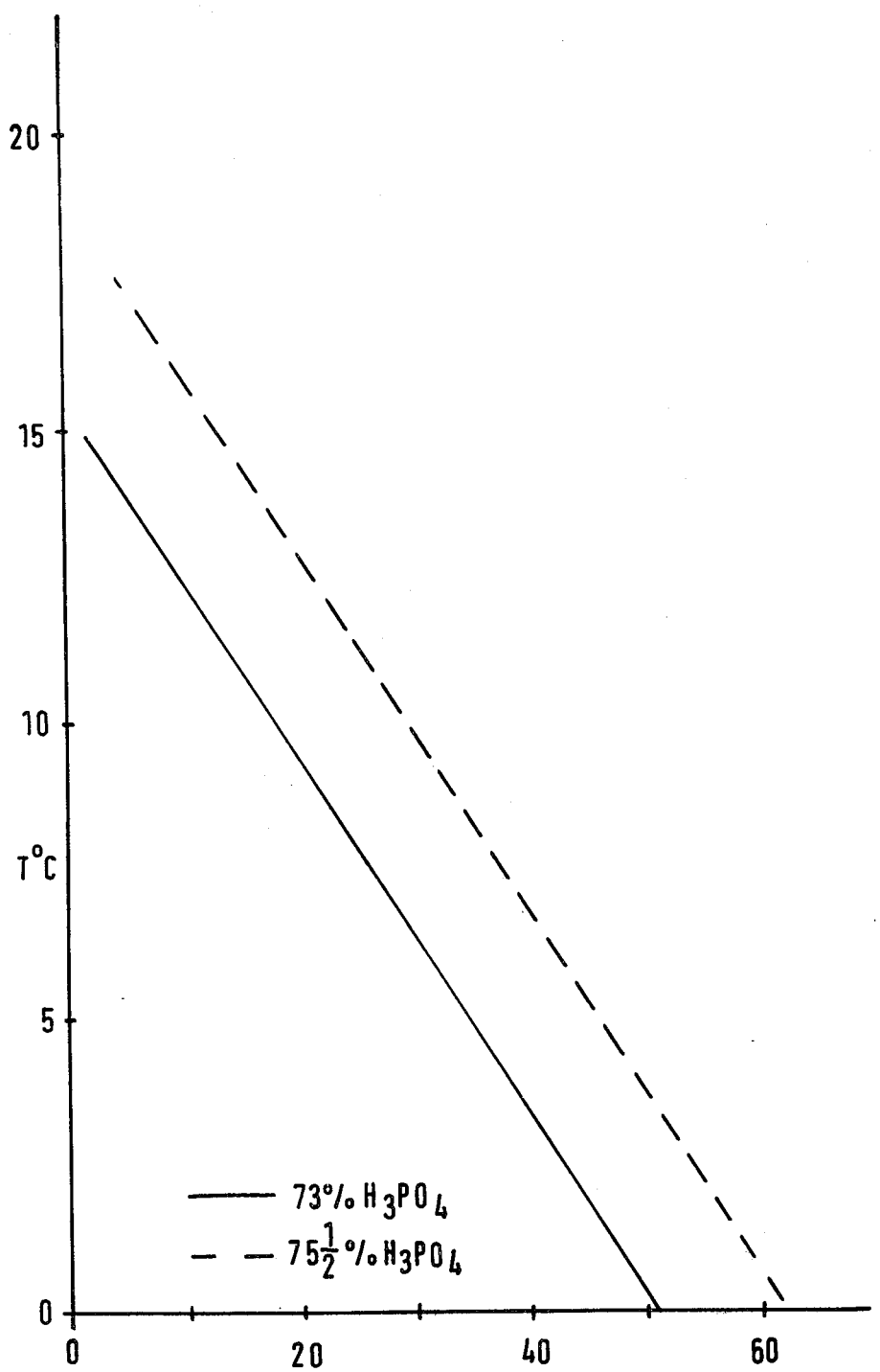

United States Patent [19]

Edwards et al.

[11] 3,947,499

[45] Mar. 30, 1976

[54] PHOSPHORIC ACID PURIFICATION

[75] Inventors: Robert Harry Edwards, Whitehaven; Thomas Alan Williams, Workington; Kenneth Hall, St. Bees, all of England

[73] Assignee: Albright & Wilson Limited, Warley, England

[22] Filed: Jan. 30, 1974

[21] Appl. No.: 437,891

[30] Foreign Application Priority Data

Feb. 7, 1973 United Kingdom............... 6056/73

[52] U.S. Cl............. 260/614 R; 423/309; 423/313; 423/321 S
[51] Int. Cl.² C07C 43/00; C01B 15/16; C01B 25/26
[58] Field of Search ............... 423/309, 313, 321 S; 260/614 C

[56] References Cited

UNITED STATES PATENTS

| | | | |
|---|---|---|---|
| 3,318,661 | 5/1967 | Schallert et al. | 423/321 |
| 3,367,738 | 2/1968 | Schallert et al. | 423/313 |
| 3,707,357 | 12/1972 | Chiang | 423/321 |

*Primary Examiner*—Oscar R. Vertiz
*Assistant Examiner*—Gregory A. Heller
*Attorney, Agent, or Firm*—Flynn & Frishauf

[57] ABSTRACT

A solid anhydrous 1:1 molar compound of phosphoric acid and diisopropyl ether is prepared from a mixture of the ether and phosphoric acid in a molar ratio (R:1) of 0.6:1 to 1.4:1 at a temperature at least as low as the crystallization temperature (T°C) governed by the relationship $T = 25(1.2-R)$. Treatment of the compound with water or a base produces purified acid or a phosphate respectively.

25 Claims, 2 Drawing Figures

PHOSPHORIC ACID PURIFICATION

The present invention relates to a phosphoric acid compound and its use in purifying phosphoric acid, especially phosphoric acid obtained by the so-called wet process, that is by the reaction of a mineral acid such as sulphuric, hydrochloric or nitric acid, with phosphate rock. Such an acid contains a number of impurities including cations such as iron, calcium, magnesium and vanadium and anions such as fluoride, silicofluoride and, if sulphuric acid was the attack acid used, sulphate ions.

Various methods for increasing the purity of such an acid to enable it to be used for example in food, detergent or metal finishing applications have been employed or suggested.

One type of process which has been particularly favoured has been solvent extraction. Among the suggested processes of this type are those of British Patent specifications Nos. 1,112,033, 1,199,042 and 1,209,272, all of which suggest the use of ethers, such as di-isopropyl ether, as solvent extractants.

In the solvent extraction processes, the wet process acid is mixed with a large excess of the solvent, e.g. diisopropylether, the phosphoric acid is extracted into the organic solvent layer and then recovered from it by washing the separated organic layer with water.

Other purification methods suggested include that described in U.S. Pat. No. 3,318,661, which involves the production of complexes of phosphoric acid and diisopropyl ether, and that described in Italian Pat. No. 699,222 and 804,739 which involve the formation of a solid complex of phosphoric acid and diisobutyl carbinol. In U.S. Pat. No. 3,318,661 the complex produced is liquid and contains phosphoric acid, diisopropyl ether and water, with the phosphoric acid and diisopropyl ether and water, with the phosphoric acid and diisopropyl ether in variable proportions depending on the temperature. Both U.S. Pat. No. 3318661 and British Patent specification No. 1,209,272 have 3-phase diagrams for the system, phosphoric acid, diisopropyl ether and water.

We have now found it is possible under certain conditions to prepare a solid anhydrous compound of phosphoric acid and diisopropyl ether even from mixtures thereof with water. This compound, which can be prepared via solvent extraction of wet process acid, can be treated with water to produce phosphoric acid having a substantially reduced content of impurities, especially anionic impurities, as compared to the solvent extract of phosphoric acid in the ether.

The present invention provides a solid anhydrous compound of phosphoric acid and diisopropyl ether of formula $H_3PO_4 \cdot [(CH_3)_2CH]_2O$. The compound has a melting point of 28°–29° C.

The present invention also provides a process for preparing the compound of phosphoric acid and diisopropyl ether, which process comprises producing a mixture of diisopropyl ether with phosphoric acid ($H_3PO_4$) in a molar proportion (R:1) of 0.6:1 to 1.4:1, preferably 0.65:1 to 0.9:1, especially about 0.77:1 and an amount of water of 0 up to 1 mole preferably 0.9 to 1 mole per mole of phosphoric acid and if the temperature of the mixture is above the crystallization temperature (T) at which crystals of the complex are formed and which is determined by the relationship $T = 25(1.2 - R)$ cooling the mixture to a temperature at least as low as the crystallization temperature, and separating the crystals of the compound. The crystallization temperature T of a mixture is thus the maximum temperature at which crystals can be formed from that mixture.

The mixture can be prepared by mixing phosphoric acid and the ether in the requisite proportions at a temperature at least as low as the crystallization temperature with cooling if necessary during the mixing when heat is liberated. The proportions of ether and phosphoric acid are such that if the mixing were carried out at a temperature above the crystallization temperature, an organic phase mixture of ether to phosphoric acid in molar ratio 0.61:1 to 1.4:1 would be formed. The necessary proportions can be determined from the 3-phase diagrams in U.S. Pat. No. 3,318,661 and British Patent specification No. 1,209,272.

However it is preferable to prepare the desired mixture at a temperature above the crystallization temperature and then subsequently cool it to at least as low as that temperature. When aqueous phosphoric acid is mixed with the ether, as in the preferred method of making the mixture, the organic extract contains fewer of the phosphoric acid impurities than the original aqueous acid. By preparing the desired mixture at above the crystallization temperature from aqueous acid, it is thus possible to effect an initial purification before the purification resulting from the compound formation. The mixture is preferably made by mixing aqueous phosphoric acid of 65 – 100 percent acidity with diisopropoyl ether, the proportions of the acid and ether being such as to prepare directly the mixture as an organic phase. If the acidity is below 85 percent there is also an aqueous phase.

The amount of ether (g) in grams (expressed as 95 percent ether 4 percent phosphoric acid and 1 percent water) to be mixed with 100g. of the aqueous phosphoric acid of acidity C percent and the crystallization temperature (T) are governed by the relationship $$g = 3.3 (1.4 (C - 65) - T).$$

The acidity (C percent) of the aqueous phosphoric acid is the percentage weight of acid in the aqueous acid, the acid being phosphoric acid ($H_3PO_4$) and, if present, sulphuric acid or other acid, which was used as the attack acid in the wet process. The sulphuric acid is usually present in the wet process phosphoric in an amount of up to 10 percent, usually 3–5 percent, of the total acidity. The aqueous phosphoric acid usually has acidity of 65–85 percent preferably 75–85 percent e.g. about 80 percent, with 2–5 percent (by weight of aqueous acid), sulphuric acid and the remainder phosphoric acid.

The accompanying drawings show the relationships between crystallization temperature the amount of diisopropyl ether and the phosphoric acid.

FIG. 1 is a graph of the crystallization temperature (i.e., the temperature above which crystals of the compound are not formed) (T°C) against the weight in grams of organic solvent (g) (defined as above) per 100g. of aqueous acid for two concentrations of phosphoric acid, 73 percent phosphoric acid ($H_3PO_4$) and 75.5 percent phosphoric acid ($H_3PO_4$), each acid solution also containing 3 percent sulphuric acid to give acidities (C percent) of 76 percent and 78.5 percent respectively. The above relationship between g, C and T is derived from this graph.

Figure 2:
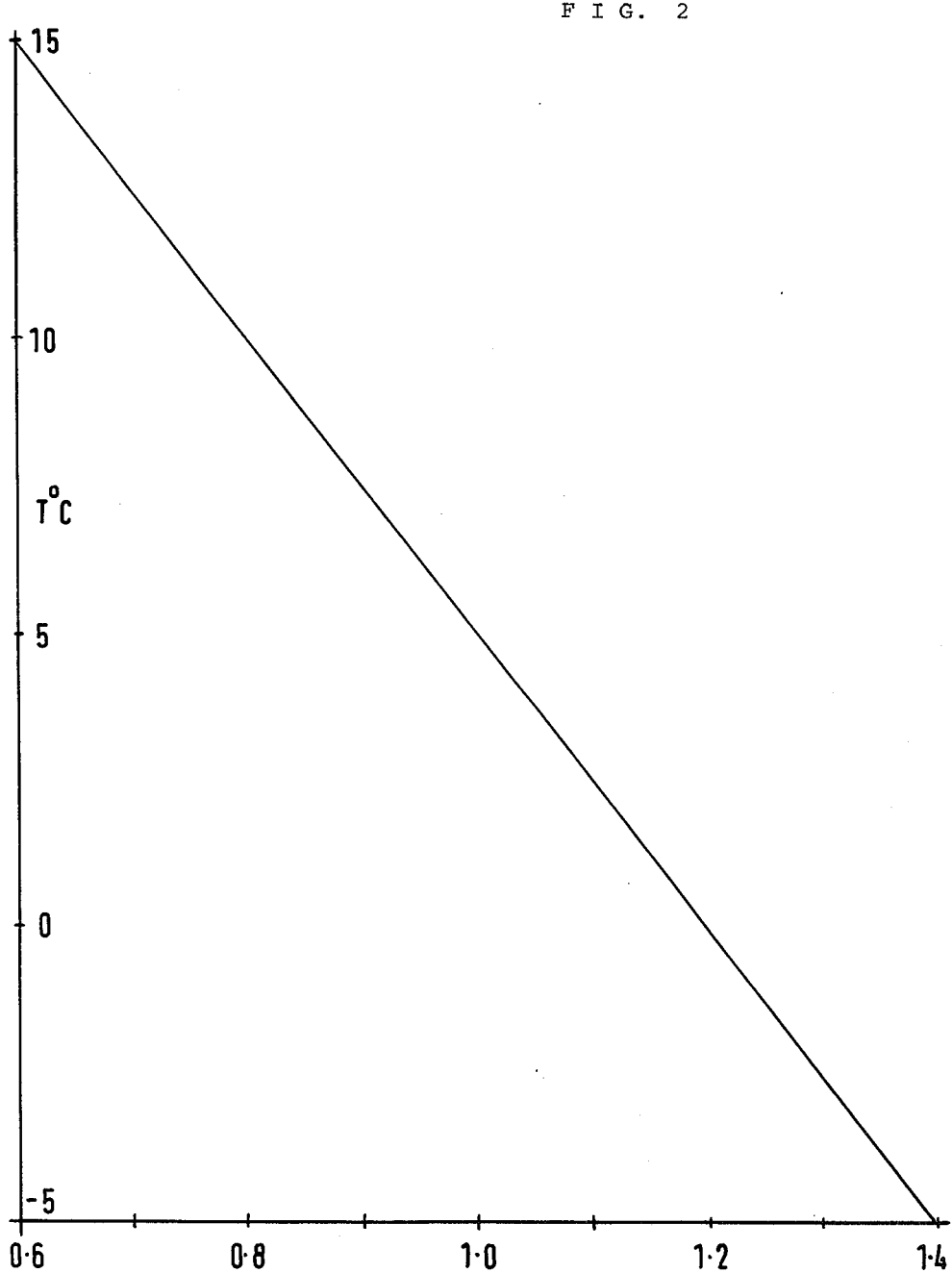

FIG. 2 is a graph of the crystallization temperature (T°C) against the molar proportion (R:1) of diisopropyl ether to phosphoric acid in the mixture in which crystals are formed. The above relationship T = 25(1.2 − R) is obtained from this graph. The mixtures from which the results in FIG. 2. were obtained, contained 0.9–1 mole water per mole of phosphoric acid. To achieve maximum extraction of phosphoric acid in the ether, the acid and ether are preferably mixed at below 30° C e.g. at −10° to 29° especially at about 5° C. Though one stage extraction can be used, preferably at least 2, e.g. 3 stages are desirable.

Alternatively the mixture from which crystals of the compound are to be deposited can be prepared by mixing diisopropyl ether and aqueous phosphoric acid of acidity 65–100 percent to form an organic phase and, if necessary, separating the organic phase from any aqueous phase present. The organic phase is then concentrated with respect to its phosphoric acid content by heating it to at least 45° C usually about 60° C to produce a diisopropyl ether phase and an acid enriched organic phase, which is the desired mixture and separating the latter from the diisopropyl ether phase which can be recycled for use as fresh extractant for aqueous acid. Alternatively the organic phase originally produced (after separation if necessary) is concentrated by evaporating the ether until the mixture of the desired molar proportions is formed. The evaporation is usually performed by heating to e.g. 30°–60° C under vacuum. The diisopropyl ether can be recovered and used as fresh extractant for aqueous acid.

Apart from mixing the acid and ether to produce the mixture directly, as sole organic phase, with or without an aqueous phase depending on the acid concentration (mixtures of ether and acid of at least 85 percent concentration are homogeneous) the acid and ether can be mixed to produce an aqueous phase, a diisopropyl ether phase usually containing at least 90 percent ether and an acid organic phase which is the desired mixture. Clearly the 3-phase system here is similar to the corresponding one produced at higher temperatures and may be treated in the same way. Alternatively the 3-phase system can be converted to the two phase system obtained directly by addition of a small amount of acid more concentrated than that in equilibrium with the organic phases.

The conditions, under which mixing the ether and aqueous phosphoric acid will produce an aqueous phase and an organic phase, which can be used directly or concentrated as described above, are dependent on the temperature and on the relative proportions of the water, acid and ether. 3-Phase diagrams for the system water acid and ether are shown in U.S. Pat. No. 3,318,661 and British Patent specification No. 1,209,272 and can be used to determine the necessary proportions. The variations in the techniques for preparing the organic mixture prior to cooling, which are described above, are described in more detail in British Patents 1,199,042 and 1,209,272.

At any stage prior to the crystallization stage, the organic phase mixture of phosphoric acid and diisopropyl ether can be scrubbed e.g. with water or dilute aqueous phosphoric acid of impurity and acid concentration less than that corresponding to equilibrium with the organic phase to reduce the impurity content of the latter.

Once the mixture of ether and phosphoric acid of the desired molar proportions is prepared it is cooled to a temperature at least as low as the crystallization temperature and preferably about 5° C below that temperature. Crystallization at a temperature not lower than −10° C is usually carried out. Crystallization occurs more easily in the presence of seed crystal of the compound, which may be added as such in batch process or are always present in crystallizations in continuous processes. The cooled mixture contains crystals of the compound and an organic phase, and when the mixture originally contained sufficient water, an aqueous phosphoric acid phase as well. The crystals are separated from the mixture usually by centrifugation. The ether phase still containing phosphoric acid can be separated and recycled for mixing with fresh mixture for cooling. The aqueous phosphoric acid phase, which is usually present, which is purer than the original wet process acid, can be separated and used as industrial grade phosphoric acid, or for scrubbing the extract in a previous stage.

While the source of the phosphoric acid in the crystals is usually wet process phosphoric acid, the source can be impure phosphoric acid of the appropriate concentration obtained from the so-called "thermal" process, i.e., from elemental phosphoroous by way of phosphorous pentoxide.

The crystals of the compound from ether and phosphoric acid are used as a source of phosphoric acid or phosphates having reduced impurities with respect to the phosphoric acid from which the compound was made.

The prime use of the crystals is for preparing purified aqueous phosphoric acid.

The present invention also provides a process for preparing phosphoric acid or phosphates which comprises treating the compound with a base, which is at least one of water, ammonia and an oxide, hydroxide, carbonate, bicarbonate or tribosic or dibasic phosphate of an alkali metal e.g. sodium or potassium, or an alkaline earth metal e.g. calcium or magnesium.

The purified phosphoric acid may be prepared by mixing the crystals with water, In a continuous process the crystals can be dropped into aqueous acid into which water and/or steam is passed. The amount of water required to release all the phosphoric acid is temperature dependant, the higher the temperature the higher the acid concentration within limits. Thus at 0° C, an acid of 62 percent $H_3PO_4$ concentration can be obtained from the compound while at 30° C, an acid of 70 percent $H_3PO_4$ is produced. Temperatures of 0°–30° C are preferred as higher temperatures tend to result in higher concentrations of ether in the acid. The addition of water produces a three component system whose phase relationships are given in the phase diagrams mentioned above. Usually sufficient water is added to produce an aqueous acid phase and a diisopropylether phase, which can be separated and recycled as fresh extractant for the acid. Any ether remaining in the acid after the release stage may be removed from the acid by conventional techniques such as steam stripping preferably under vacuum, or liquid liquid extraction with a solvent which is insoluble in phosphoric acid e.g. an aliphatic hydrocarbon such as kerosene.

The phosphates may be prepared by mixing the compound with the base, usually in aqueous solution (or suspension in the case of sparingly soluble compounds e.g. calcium carbonate). Thus ammonia present in solution or as a gas forms ammonium phosphates e.g. the dihydrogen salt used in food. Alkali metal hydroxides carbonates or bicarbonates form the corresponding phosphate such as food grade sodium or potassium phosphates e.g. the tribasic and dibasic phosphates or a mixture of phosphate e.g. the 1:2 molar mixture of sodium dihydrogen phosphate and disodium hydrogen phosphate used to prepare sodium tripolyphosphate. Alkaline earth metal hydroxide, carbonate or bicarbonate forms the corresponding phosphate e.g. food grade mono and di-calcium phosphate such as dicalcium phosphate used in toothpaste. The use of tribasic phosphate (e.g. trisodium phosphate) or dibasic phosphate (e.g. disodium hydrogen phosphate) may be preferred to the initial use of the metal carbonates, because the addition of aqueous phosphate produces acid phosphate and liberates ether, which is separated; the acid phosphate can be neutralized further if needed with metal carbonate or bicarbonate. By the two step process the production of carbon dioxide and liberated ether at the same time which occurs with direct contact of the crystals and carbonate is avoided, resulting in better ether recovery and reduction in frothing.

The compound can also be used to prepare ortho phosphoric acid by evaporating the ether off the crystals, e.g. by placing them under reduced pressure and usually with heating, e.g. by counter current contact between the compound and hot inert gases under reduced pressure at up to 100° C.

The invention is illustrated in the following Examples:

EXAMPLE 1

1 litre of wet process phosphoric acid (specific gravity 1.65) containing 75.5 percent $H_3PO_4$, 3.0 percent $H_2SO_4$ and 0.33 percent Fe and 1 litre of solvent, 95 percent isopropyl ether 4 percent $H_3PO_4$ and 1 percent $H_2O$), were mixed and cooled to around 5° C during which time seed crystals were added.

The resulting magma was centrifuged yielding 169g. of crystals containing 49.5 percent $H_3PO_4$, with less than 0.3 percent $H_2SO_4$, less than 1 percent water and less than 50 ppm Fe. and 49.2 percent diisopropyl ether; the calculated values for a compound of formula $H_3PO_4 C_6H_{14}O$ are 49.0 percent $H_3PO_4$ and 51.0 percent $C_6H_{14}O$.

Phosphoric acid was recovered from the crystals by mixing them with water and separating the aqueous acid from the organic solvent. 26 parts of water per 100 parts by weight of crystals were used at 5° C with heating as necessary to prepare a 65 percent aqueous phosphoric acid solution.

EXAMPLE 2

1 litre of the wet process acid as used in Example 1 and 2.5 litres of solvent also as used in Example 1 were mixed and cooled to around 5° C. The mixture was allowed to separate and 374 mls of aqueous raffinate specific gravity 1.55, containing 64 percent $H_3PO_4$ and the bulk of the impurities were discarded.

The organic extract was heated to 60° C during which time 1525 mls of solvent separated, and were removed. The phosphoric acid enriched extract remaining was cooled to around 5° C and seed crystals were added. The resultant magma was centrifuged and 805g. of crystals were recovered which contained 49.5 percent $H_3PO_4$, less than 0.05 percent $H_2SO_4$, and less than 5 ppm Fe. The liquid phase was a two phase mixture of an organic phase, which could be recycled, and an aqueous phase which was 290 mls of aqueous phosphoric acid specific gravity 1.50 containing 69 percent $H_3PO_4$.

A total mass balance was not possible due to evaporation of isopropyl ether during separation.

The crystals were converted to aqueous phosphoric acid as in Example 1.

EXAMPLE 3

1 kg of wet process phosphoric acid containing 75 percent $H_3PO_4$ and 4 percent $H_2SO_4$ and 0.33 percent Fe was extracted at with 0.66 kg of organic solvent as in Example 1 using a 3-stage adiabatic counter current extraction apparatus. The aqueous raffinate was at 5° C.

The organic extract, which contained 1 mole diisopropyl ether and 1 mole of water per mole of phosphoric acid, was cooled to −5° C and seed crystals of the compound added. The compound crystallized out and an aqueous phosphoric acid phase also separated.

The crystals had the same purity as those of Example 2 and were converted to phosphoric acid by treatment with water as in Example 1.

EXAMPLE 4

1 kg of wet process acid (as used in Example 3) was extracted at 5° C with 1.65 kg of organic solvent as in Example 1 using a 1-stage extraction apparatus. The organic extract was heated to about 60° C to produce a diisopropyl ether phase, which can be recycled for use as fresh extractant, and an acid enriched organic phase having a composition of 0.77 mole diisopropyl ether, 1 mole water and 1 mole phosphoric acid. The acid enriched organic phase is separated and cooled to −5° C in the presence of seed crystals of the compound $(H_3PO_4.C_6H_{14}O)$. The crystals of the compound produced were centrifuged from the mixture of organic phase and an aqueous phosphoric acid phase, had a similar purity to those of Example 2, and were converted to phosphoric acid by treatment with water as in Example 2.

We claim:

1. A process for preparing an anhydrous crystalline compound of phosphoric acid and diisopropyl ether having the formula $H_3PO_4[(CH_3)_2CH]_2O$, comprising mixing aqueous wet process phosphoric acid of 65–85 percent acidity with diisopropyl ether to produce an aqueous phase, and an organic phase which is a mixture of said ether and phosphoric acid in a molar proportion (R:1) of 0.6:1 to 1.4:1 and an amount of water of up to 1 mole water per mole of phosphoric acid, separating said aqueous phase from said organic phase, and forming crystals of said compound from said mixture at a temperature which is at least as low as the crystallization temperature T in degrees Centigrade which is determined by the relationship $T=25(1.2−R)$, and separating said crystals.

2. A process according to claim 1 wherein said mixture at the temperature at least as low as the crystallization temperature contains seed crystals of said anhydrous compound.

3. A process according to claim 1 wherein said mixture is produced at a temperature above the crystallization temperature and then cooled to a temperature at least as low as the crystallization temperature to produce said anhydrous compound.

4. A process according to claim 1 wherein said mixture contains 0.9 – 1 mole water per mole of phosphoric acid.

5. A process according to claim 3 wherein said mixture contains 0.9 – 1 mole water per mole of phosphoric acid.

6. A process according to claim 3 wherein said mixture contains diisopropyl ether and phosphoric acid in a molar proportion of 0.65:1 to 0.9:1.

7. A process according to claim 4 wherein said mixture contains diisopropyl ether and phosphoric acid in a molar proportion of 0.65:1 to 0.9:1.

8. A process according to claim 5 wherein said mixture contains diisopropyl ether and phosphoric acid in a molar proportion of 0.65:1 to 0.9:1.

9. A process according to claim 8 wherein said mixture at the temperature at least as low as the crystallization temperature contains seed crystals of said anhydrous compound.

10. A process according to claim 8 wherein said aqueous wet process phosphoric acid and diisopropyl ether are mixed at a temperature below 30° C.

11. A process according to claim 8 wherein said aqueous wet process phosphoric acid and diisopropyl ether are mixed in a counter current extraction apparatus having at least two stages.

12. A process for preparing an anhydrous crystalline compound of phosphoric acid and diisopropyl ether having the formula $H_3PO_4 \cdot [(CH_3)_2CH]_2O$, comprising mixing aqueous wet process phosphoric acid of 65–85 percent acidity with diisopropyl ether to form an organic phase and an aqueous phase, separating said aqueous phase from said organic phase and heating said organic phase to at least 45° C to produce a diisopropyl ether phase, and an acid enriched organic phase which is a mixture of said ether and phosphoric acid in a molar proportion (R:1) of 0.6:1 to 1.4:1 and an amount of water of up to 1 mole water per mole of phosphoric acid, separating said ether phase from said mixture, and cooling said mixture to a temperature at least as low as the crystallization temperature T in degrees Centigrade at which crystals of said compound are formed and which is determined by the relationship $T=25(1.2-R)$ to form crystals of said compound, and separating said crystals.

13. A process according to claim 12 wherein said mixture at the temperature at least as low as the crystallization temperature contains seed crystals of said anhydrous compound.

14. A process according to claim 12 wherein said mixture contains 0.9–1 mole water per mole of phosphoric acid.

15. A process according to claim 14 wherein said mixture contains diisopropyl ether and phosphoric acid in a molar proportion of 0.65:1 to 0.9:1.

16. A process according to claim 15 wherein said mixture at the temperature at least as low as the crystallization temperature contains seed crystals of the anhydrous compound.

17. A process for preparing a phosphorus compound selected from the group consisting of phosphoric acid and phosphates, which comprises treating said anhydrous compound prepared by the process claimed in claim 12 with a basic compound selected from the group consisting of water, ammonia, and an oxide, hydroxide, carbonate, bicarbonate, tribasic phosphate and dibasic phosphate of an alkali metal of alkaline earth metal.

18. A process for preparing an anhydrous crystalline compound of phosphoric acid and diisopropyl ether having the formula $H_3PO_4 \cdot [(CH_3)_2CH]_2O$, comprising mixing aqueous wet process phosphoric acid of 65–85 percent acidity with diisopropyl ether to form an organic phase and an aqueous phase separating said aqueous phase from said organic phase and evaporating the ether from said organic phase to form a mixture of said ether, phosphoric acid and water in a molar proportion (R:1) of 0.6:1 to 1.4 and an amount of water of up to 1 mole per mole of phosphoric acid, and cooling said mixture to a temperature at least as low as the crystallization temperature T in degrees Centigrade at which crystals of said compound are formed and which is determined by the relationship $T=25(1.2-R)$ to form crystals of said compound, and separating said crystals.

19. A process according to claim 18 wherein said mixture at the temperature at least as low as the crystallization temperature contains seed crystals of said anhydrous compound.

20. A process according to claim 19 wherein said mixture contains 0.9 – 1 mole water per mole of phosphoric acid.

21. A process for preparing a phosphorous compound selected from the group consisting of phosphoric acid and phosphates, which comprises treating said anhydrous compound prepared by the process claimed in claim 18 with a basic compound selected from the group consisting of water, ammonia, and an oxide, hydroxide carbonate, bicarbonate, tribasic phosphate and dibasic phosphate of an alkali metal or alkaline earth metal.

22. A process according to claim 1 which comprises treating said separated crystals with a basic compound selected from the group consisting of water, ammonia, and an oxide, hydroxide, carbonate, bicarbonate, tribasic phosphate and dibasic phosphate of an alkali metal or alkaline earth metal.

23. A process for preparing a phosphorus compound selected from the group consisting of phosphoric acid and phosphates which comprises treating the compound of formula $H_3PO_4 \cdot [(CH_3)_2CH]_2O$ with a basic compound selected from the group consisting of water, ammonia, and an oxide, hydroxide, carbonate, bicarbonate, tribasic phosphate and dibasic phosphate of an alkali metal or alkaline earth metal.

24. A process according to claim 22 wherein the compound is treated with water to produce aqueous phosphoric acid and diisopropyl ether, and the acid is separated from the ether.

25. A process according to claim 23 wherein the compound is treated with water to produce aqueous phosphoric acid and diisopropyl ether, and the acid is separated from the ether.

* * * * *